(12) United States Patent
Blake et al.

(10) Patent No.: US 7,549,583 B2
(45) Date of Patent: Jun. 23, 2009

(54) METHOD FOR WAKING UP IN-COUNTER FIXED SCANNERS

(75) Inventors: Robert E. Blake, Woodbury Heights, NJ (US); Donald T. Hudrick, Sicklerville, NJ (US); David M. Wilz, Sr., Sewell, NJ (US); Stephen J. Colavito, Boothwyn, PA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 216 days.

(21) Appl. No.: 11/683,065

(22) Filed: Mar. 7, 2007

(65) Prior Publication Data

US 2008/0217410 A1 Sep. 11, 2008

(51) Int. Cl.
*H02P 1/00* (2006.01)

(52) U.S. Cl. .............................. 235/462.3; 235/462.14; 235/462.31; 235/462.43; 235/462.48

(58) Field of Classification Search ............ 235/472.01, 235/472.02, 472.03, 462.14, 462.3, 462.31, 235/462.43, 462.48, 454
See application file for complete search history.

(56) References Cited

U.S. PATENT DOCUMENTS

| | | | | |
|---|---|---|---|---|
| 5,099,110 | A * | 3/1992 | Shepard et al. | 235/472.01 |
| 5,422,469 | A | 6/1995 | Bard et al. | |
| 5,693,929 | A * | 12/1997 | Dvorkis et al. | 235/454 |
| 5,973,318 | A | 10/1999 | Plesko | |
| 6,069,560 | A | 5/2000 | Larsson | |
| 6,173,895 | B1 * | 1/2001 | Plesko | 235/462.33 |
| 6,227,450 | B1 | 5/2001 | Blake et al. | |
| 6,641,043 | B1 * | 11/2003 | Plesko | 235/462.33 |

* cited by examiner

*Primary Examiner*—Thien M. Le
*Assistant Examiner*—Tuyen K Vo
(74) *Attorney, Agent, or Firm*—Duane Morris, LLP

(57) ABSTRACT

A method of waking up an in-counter bar code scanner from its standby mode comprises providing a sensor assembly attached to a touch plate. The sensor assembly comprises an oscillating magnet member affixed at one end and a permanent magnet attached at an opposite free end at the end of a flexible member. When a user touches the touch plate, the impact force exerted on the touch plate is transmitted to the oscillating magnet member causing the magnet to oscillate inducing an electrical signal in a pick-up coil provided near the magnet and wakes up the bar code scanner.

6 Claims, 3 Drawing Sheets

METHOD FOR WAKING UP IN-COUNTER FIXED SCANNERS

FIELD OF THE INVENTION

The invention relates to a method and a device for waking up in-counter fixed bar code scanners.

BACKGROUND

Bar code readers are found in many commercial environments such as, for example, point-of-sale stations in retail stores and supermarkets, inventory and document tracking, and diverse data control applications. To meet the growing demands, bar code symbol readers of various types have been developed for scanning and decoding bar code symbol patterns and producing symbol character data for use as input in automated data processing systems. The bar code scanners generally are available in hand-held, hands-free or in-counter formats.

In additions to on/off modes, many bar code scanners have a standby or sleep mode to conserve power. There are a variety of ways for a scanner to enter a sleep mode, for example, if scanned bar code data is not detected for a defined period of time, the scanner may enter the reduced power standby or sleep mode.

Once a scanner goes in to a sleep mode, it has to "wake up" to be operational again. A variety of methods for waking up bar code scanners are known in the art. One method uses a trigger mechanism. Some trigger mechanisms are mechanical switches that must be depressed or pushed to wake up the scanner. Some trigger mechanisms are capacitance touch plates. Using a switch or a capacitance touch plate to wake up a scanner exposes the sensitive electrical circuitry inside the scanners at risk from damage by electrostatic discharge (ESD). ESD is a sudden and momentary electric current that occurs when excess electric charge, stored on an electrically insulated body, finds a path to an object having a different electric potential. ESD can have a significant detrimental effect on electronic circuits, such as those inside bar code scanners.

In conventional bar code scanners, hand held and in-counter, infrared (IR) activation sensors are generally used for waking up the scanner. IR activation sensors have been commonly used in conventional in-counter bar code scanners. In an IR activation system, an IR detection unit constantly scans for a motion within a specific range in front of the scanning device. If a predetermined amount of motion or IR signal is detected by the IR detection unit, then the scanner is waken up. But because IR detection unit is an active device that is constantly on while the scanner is in the sleep mode, this solution diminishes the power-saving benefit of the sleep mode.

Yet another method of waking up a scanner is by intermittently turning on the bar code scanning circuitry of the scanner. In this method, the bar code scanning circuitry (e.g., the light source, oscillating mirror assembly and accompanying electrical circuitry, for example,) is pulsed on and off at a predetermined interval. If a usable data signal is returned, for example, a reflected light signal containing bar code information, then the scanner will exit the standby or sleep mode and remain on. In addition to consuming power by constantly turning the scanning circuitry on and off this method reduces the reliability of the scanner by continuously cycling the scanning circuitry and the associated mechanisms through on/off cycles when the scanner is in the sleep mode.

Thus, an improved method for waking up bar code scanners from sleep mode is desired.

SUMMARY

According one embodiment, a method of providing a wake up feature to an in-counter bar code scanner allowing a user to wake up the bar code scanner from its power-saving standby mode is disclosed. The method comprises attaching an oscillating magnet member to a portion of the bar code scanner. The oscillating magnet member comprises a base and a permanent magnet attached to the base by a flexible member extending between the base and the permanent magnet. The base of the oscillating magnet member is attached to the portion of the bar code scanner and the permanent magnet end is a free end allowing the magnet to oscillate. The method further comprises attaching a pick-up coil to the portion of the bar code scanner at a magnetically effective distance from the permanent magnet. Thus, when a user touches the portion of the bar code scanner, the resulting impact force exerted on the bar code scanner is transmitted to the oscillating magnet member causing the permanent magnet to oscillate. The oscillating motion of the magnet induces an electrical signal in the pick-up coil for waking up the bar code scanner from its standby mode.

The portion of the bar code scanner to which the base of the oscillating magnet member and the pick-up coil are attached can be any appropriate portion of the bar code scanner where it would be convenient and practical for the user to touch the bar code scanner in order to wake up the bar code scanner. The location where the base of the oscillating magnet member is attached should be such that the impact force from the user's touch is efficiently transmitted to the oscillating magnet member. For example, the base of the oscillating magnet member can be attached to an interior surface of the bar code scanner housing with an appropriate marking on the housing to indicate where the user should touch.

In another embodiment, the base of the oscillating magnet member can be attached to the interior surface of the scanning surface of the in-counter bar code scanner. The scanning surface is typically a glass plate through which the scanning laser beams of the bar code scanner reads the bar code symbols. The user would wake up the bar code scanner by touching the scanning surface.

In another embodiment, a separate touch plate can be provided on the bar code scanner and the base of the oscillating magnet member can be attached to the interior surface of the touch plate. The user would wake up the bar code scanner by touching the scanning surface.

In all of the exemplary embodiments, the pick-up coil is positioned at a magnetically effective distance from the permanent magnet. This means that the pick-up coil is sufficiently close to the permanent magnet to be within the magnetic field of the permanent magnet. Thus, when the permanent magnet oscillates, the fluctuations in the strength of the magnetic field induces a current in the pick-up coil to be used as a trigger signal to wake up the scanner.

According to another embodiment, a method of providing a wake up feature to an in-counter bar code scanner allowing a user to wake up the bar code scanner from its power-saving standby mode comprises attaching a sensor assembly to a portion of the bar code scanner. The sensor assembly comprises a frame member, an oscillating magnet member having a base and a permanent magnet attached to the base by a flexible member extending between the base and the permanent magnet. The base of the oscillating magnet member is attached to the frame member. The sensor assembly also includes a pick-up coil attached to the frame member at a magnetically effective distance from the permanent magnet. As in the previous embodiment, when a user touches the portion of the bar code scanner where the sensor assembly is attached, an impact force exerted on the bar code scanner is transmitted to the oscillating magnet member causing the permanent magnet to oscillate, thus, inducing an electrical signal in the pick-up coil for waking up the bar code scanner from its standby mode.

The portion of the bar code scanner to which the frame member of the sensor assembly is attached can be any appropriate portion of the bar code scanner where it would be convenient and practical for the user to touch the bar code scanner in order to wake up the bar code scanner from its standby mode. For example, the sensor assembly can be attached to an interior surface of the bar code scanner housing with an appropriate marking on the housing to indicate where the user should touch. In another embodiment, the sensor assembly can be attached to the interior surface of the scanning surface of the bar code scanner. In yet another embodiment, the sensor assembly can be attached to the interior surface of a touch plate that is provided on the bar code scanner.

According to another embodiment, an in-counter bar code scanner having a sensor system for waking up the bar code scanner from its power-saving standby mode is disclosed. The sensor system comprises an oscillating magnet member comprising a base and a permanent magnet attached to the base by a flexible member extending between the base and the permanent magnet. The base of the oscillating magnet member is attached to a portion of the bar code scanner. The sensor system further includes a pick-up coil provided at a magnetically effective distance from the permanent magnet and attached to the bar code scanner. When a user touches the bar code scanner and exerts an impact force on the bar code scanner, the impact force is transmitted to the oscillating magnet member causing the permanent magnet to oscillate and, thus, inducing an electrical signal in the pick-up coil for waking up the bar code scanner from its standby mode.

According to another embodiment, the bar code scanner is provided with a touch plate having an exterior surface exposed to the user and an interior surface, and the base of the oscillating magnet member is attached to the interior surface of the touch plate. In another embodiment, the base of the oscillating magnet member can be attached to the interior surface of the scanning surface portion of the bar code scanner. In another embodiment, the base of the oscillating magnet member can be attached to the interior surface of the bar code scanner's housing. In yet another embodiment, the components of the sensor system can be mounted/attached to a frame member and the frame member, in turn, is attached to the appropriate portion of the bar code scanner.

The method disclosed herein enables an in-counter bar code scanner with a wake up feature without the concern for ESD related problems while providing the reliability of touch control.

BRIEF DESCRIPTION OF THE DRAWINGS

All drawings are schematic and are not drawn to scale. Like reference numbers represent like elements.

DETAILED DESCRIPTION

Figure 1:
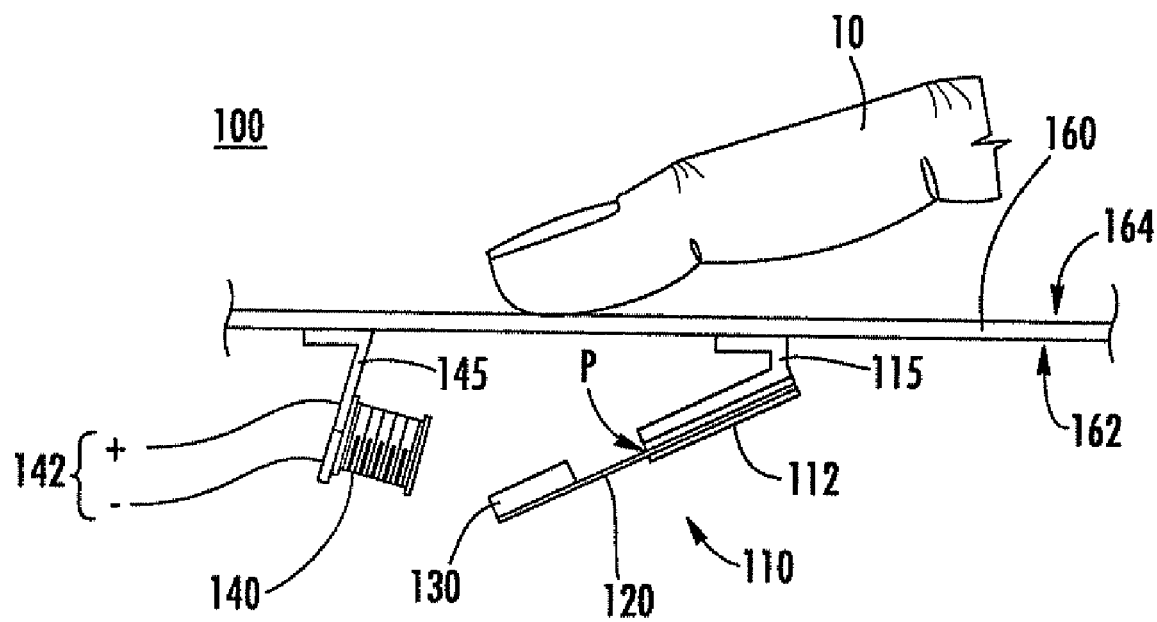
FIG. 1 is an illustration of a sensor system for waking up an in-counter bar code scanner according to an embodiment.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise.

FIG. 1 illustrates an exemplary embodiment of a wake up sensor arrangement 100 that can be incorporated into an in-counter bar code scanner to provide a wake up feature allowing a user to manually wake up the bar code scanner from its power-saving standby mode. The sensor arrangement 100 comprises an oscillating magnet member 110 and a pick-up coil 140 attached to a portion 160 of an in-counter bar code scanner. The oscillating magnet member 110 includes a base portion 112 and a permanent magnet 130 connected to the base by a flexible member 120 extending therebetween. The flexible member 120 is affixed at the base 112 but free to swing or oscillate about the pivot point P at the permanent magnet end.

The portion 160 of the bar code scanner can be any appropriate part of the bar code scanner that is readily accessible to the user and practical for the user to touch. That portion 160 is where the user would touch to wake up the bar code scanner from its' standby mode. For example, the portion 160 of the bar code scanner can be a part of the scanner's housing, the scanner's scanning surface, or a touch plate that has an interior surface 162 and an exterior surface 164, the exterior surface 164 being exposed to the user 10. The oscillating magnet member 110 and the pick-up coil 140 are preferably attached to the interior surface 162 of the portion 160.

A touch plate would look similar to a touch pad pointing device on many laptop computers at least in exterior appearance. The touch plate can be any size and can have any outline shape (e.g., square, rectangular, circular, etc.) and it can be made from any appropriate material, such as, plastic or metal.

The base 112 of the oscillating magnet member 100 can be attached to the interior surface 162 by any appropriate means. In this example, the base 112 is attached to the interior surface 162 by an appropriately configured bracket 115. The bracket 115 can then be attached to the base 112 and the interior surface 162 by an adhesive, ultrasonic bonding, brazing, soldering, or other appropriate fastening means. The key is that the base 112 is physically connected to the portion 160 of the bar code scanner so that when the user 10 touches the portion 160, the impact force thus imposed is efficiently transmitted to the oscillating magnet member 110 and causes the permanent magnet 130 to oscillate. The oscillating motion of the permanent magnet 130 induces a current in the pick-up coil 140, thus, realizing an electrical signal at the terminals 142 of the pick-up coil.

The amplitude and frequency of the permanent magnet's oscillation will depend on the spring constant of the oscillating magnet member 110. The spring constant will be a function of the material and dimension of the flexible member 120 and the mass of the permanent magnet and, thus, the spring constant can be optimized by varying these parameters to achieve the desired oscillation motion of the permanent magnet for generating the necessary signal in the pick-up coil. The flexible member 120 can be any one of a variety of material such a strip of polymer or metal, for example. An example of a polymer material that can be used for the flexible member 120 is Kapton®.

Figure 2:
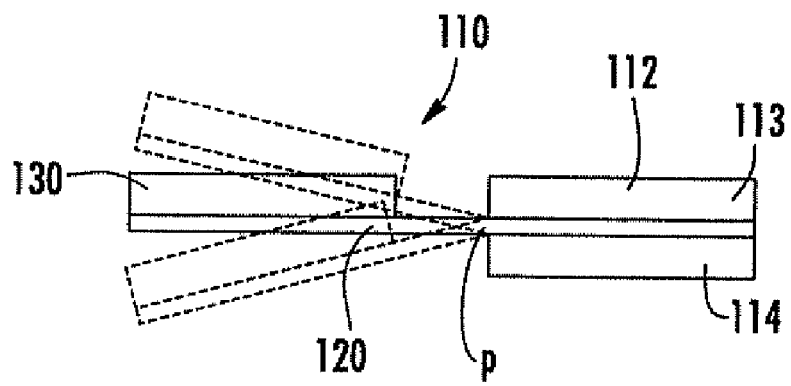
FIG. 2 is a detailed illustration of an oscillating magnet member according to an embodiment.

FIG. 2 is a more detailed illustration of an embodiment of the oscillating magnet member 110 shown in FIG. 1. The oscillating magnet member may be constructed in many different configurations and this is just one example. The flexible member 120 extends between the base 112 and the permanent magnet 130. The flexible member 120 is secured to the base 112 at one end and the permanent magnet 130 is attached to the opposite end of the flexible member 120 at a distance apart from the base 112 so that the flexible member 120 flexes about the pivot point P and allow the permanent magnet 130 to freely oscillate as shown by the broken lines. The flexible member 120 is secured to the base 112 by being held between two parts 113, 114 of the base 112. The base 112 can be made of any appropriate material such as a plastic, metal or composite. The flexible member 120 can be held between two parts 113, 114, for example, by being laminated with an adhesive, ultrasonically bonded (if the base 112 material is plastic), or mechanically secured by bolts, screws, rivets, etc.

Figure 3:
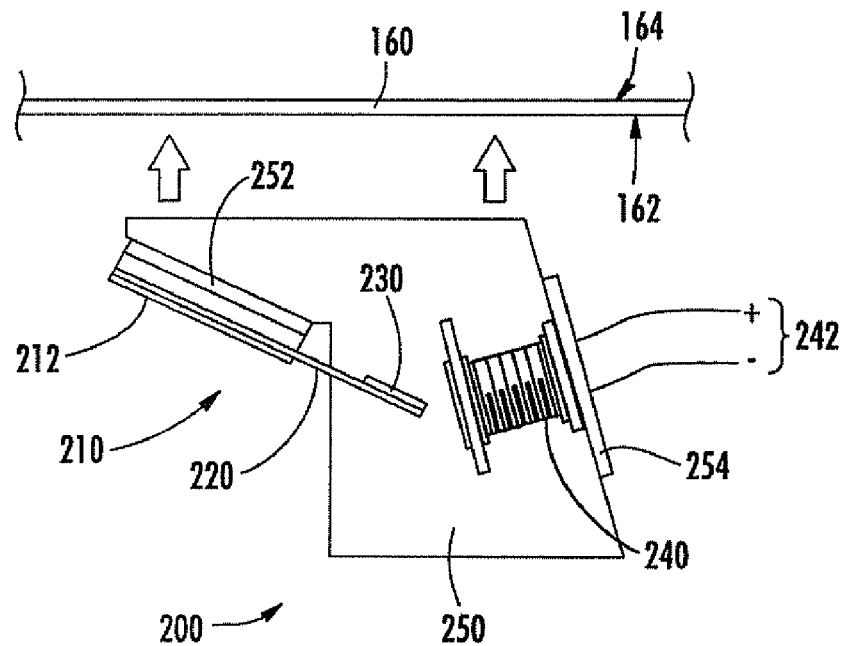
FIG. 3 is an illustration of a sensor assembly for waking up an in-counter bar code scanner according to an embodiment.

FIG. 3 is an illustration of a wake up sensor assembly 200 according to another embodiment. The sensor assembly 200 is a modular version where the wake up sensor components are mounted on a single frame member 250. The sensor assembly 200 comprises an oscillating magnet member 210 and a pick-up coil 240 both attached to the frame member 250. The oscillating magnet member 210 includes a base portion 212 and a permanent magnet 230 connected to the base by a flexible member 220 extending therebetween.

The base 212 of the oscillating magnet member 210 and the pick-up coil 240 can be attached to the frame member 250 by any appropriate means. In this example, the frame member 250 is configured with flanges 252 and 254 to which the base 212 and the pick-up coil 240 are attached, respectively. The base 212 and the pick-up coil 240 may be attached to their respective flanges 252, 254 by an adhesive, ultrasonic bonding, brazing, soldering, bolts, rivets or other appropriate fastening means.

The sensor assembly 200 is a complete sensor device that can be attached to a portion 160 of the in-counter bar code scanner and used as a sensor for detecting when to wake up the bar code scanner from its standby mode. The portion 160 of the bar code scanner can be any appropriate part of the bar code scanner as discussed above with the first embodiment. That portion 160 of the bar code scanner can be a part of the scanner's housing, the scanner's scanning surface, or a touch plate that has an interior surface 162 and an exterior surface 164, the exterior surface 164 being exposed to the user 10. Preferably, the sensor assembly 200 is attached to the interior surface 162 of the bar code scanner.

When the user 10 touches the portion 160 of the in-counter bar code scanner, the impact force thus imposed is transmitted to the oscillating magnet member 210 and causes the permanent magnet 230 to oscillate. The oscillating motion of the permanent magnet 230 induces a current in the pick-up coil 240, thus, realizing an electrical signal at the terminals 242 of the pick-up coil.

The permanent magnets 130, 230 may be made from any permanently magnetic material (e.g., ferrite, neodymium, samarium-cobalt, etc.). An example is a neodymium magnet which are less expensive and provide a greater magnetic strength to size ratio. For a given flexible member 120, 220, the magnets 130, 230 should not be too heavy so that weight of the magnets do not overwhelm the spring force of the flexible members 120, 220, thus, preventing the magnets from oscillating.

Figure 4:
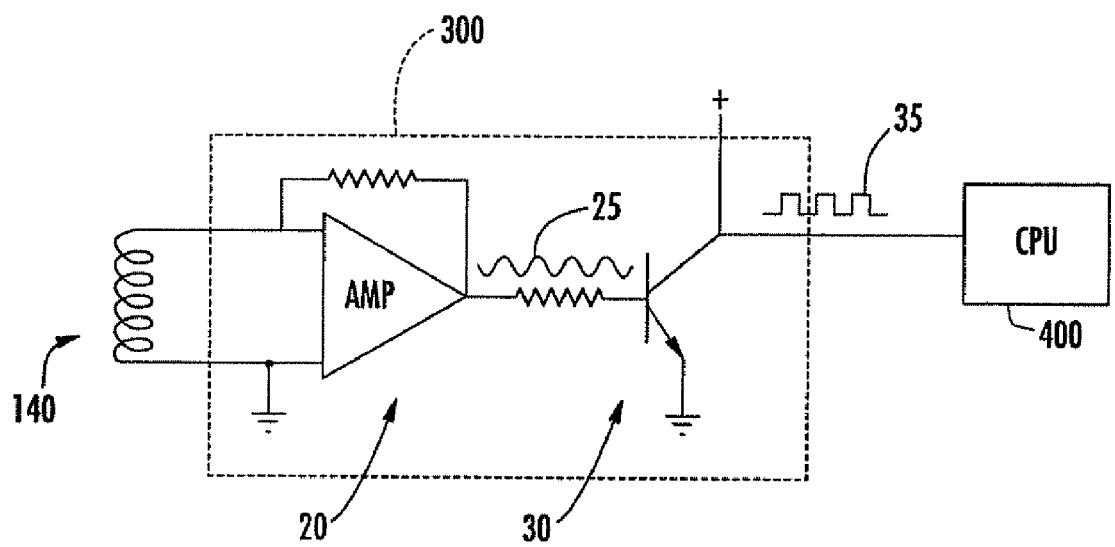
FIG. 4 is an illustration showing how the signal generated in the pick-up coil can be used to wake up a bar code scanner.

FIG. 4 is a schematic block diagram illustration of a wake up signal detection amplifier circuit 300 showing an example of how the wake up signal from the pick-up coil can be used to turn on or wake up the bar code scanner. The wake up signal current induced in the pick-up coil 140 produces a time varying voltage that is amplified by an amplifier 20. The amplified signal 25 is an analog signal formed of a series of pulses induced by the oscillating permanent magnet. The amplified signal 25 is then processed through a switching transistor operating in saturation as a threshold detector 30. The threshold detector 30 converts the amplified signal 25 to a series of clipped square pulses 35. The square pulse signal 35 from the threshold detector 30 is then transmitted to a central processing unit (CPU) 400 of the bar code scanner. The CPU 400 is appropriately programmed to recognize the incoming square pulses from the switching transistor as a wake up signal and the CPU will turn on the scanner system. Alternatively, the threshold detector 30 can be appropriately selected to output a square pulse signal having a desired peak potential to turn on the scanner's power directly.

The sensitivity of the wake up signal detection amplifier circuit 300 can be configured to have a desired sensitivity so that extraneous noise signal that may be induced by background vibrations from the bar code scanner's environment can be filtered. For example, the threshold detector 30 can be selected so that its Base to Emitter potential has to be above a certain level before the output at its Collector terminal is turned on. Similarly, the transistor 30 may be replaced with a comparator that can distinguish the amplitude of the signal 25 generated by a typical "touch" of a user from a signal generated by background vibrations. The reference voltage of such a comparator can be used to adjust its sensitivity. Additionally, the duration of the amplified signal 25 also can be used to distinguish between the desired wake up signal from noise generated by background vibrations. The duration of the signal can be calculated in the CPU 400. By sampling and characterizing the amplitude and/or duration profile of a typical "touch," the information can be utilized to distinguish the wake up signal from the noise.

Figure 5:
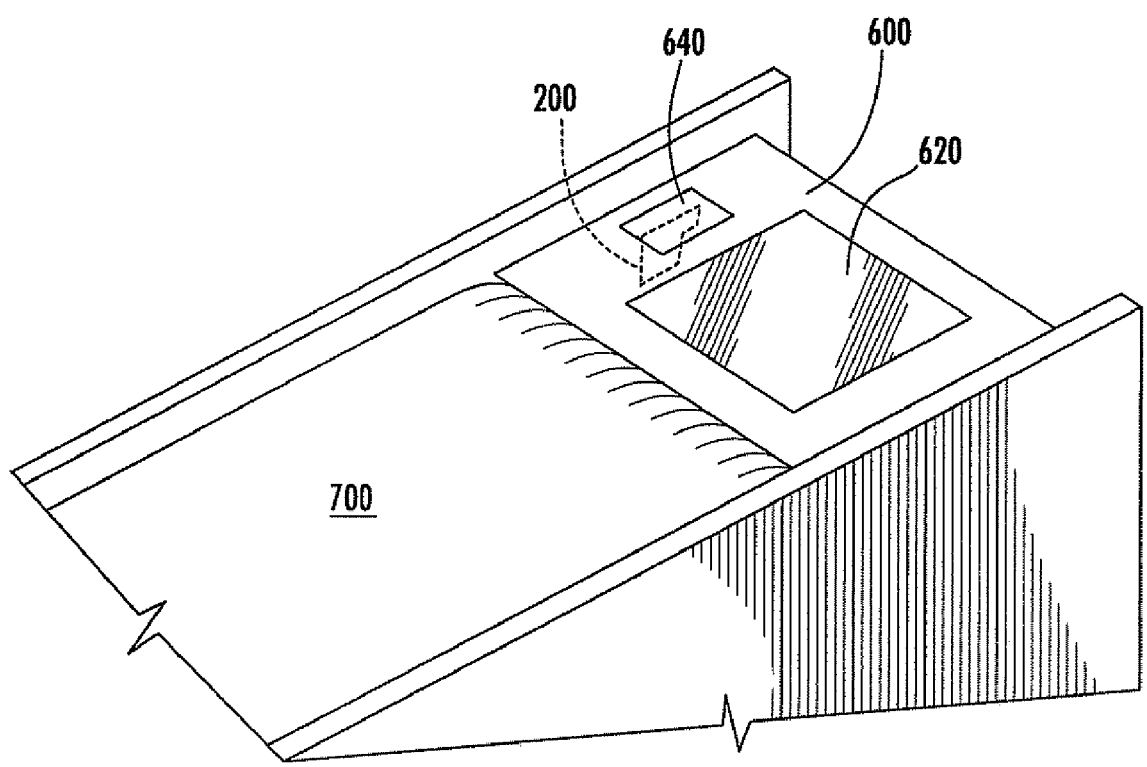
FIG. 5 is an illustration of an in-counter bar code scanner according to an embodiment.

In another embodiment, the frame member 250 discussed above in reference to FIG. 3 can be a circuit board on which the wake up signal processing circuit discussed above can be provided Referring to FIG. 5, an example of in-counter bar code scanner 600 provided with a wake up feature according to an embodiment of the present invention is illustrated. The in-counter bar code scanner 600 is located at the end of a typical check-out counter conveyor 700. As discussed above, the sensor system 100 or the sensor assembly 200 may be provided in the bar code scanner 600 by attaching the sensor system 100 or the sensor assembly 200 on the underside of the scanning surface 620. Alternatively, the sensor system 100 or the sensor assembly 200 may be attached to a touch plate 640 on the interior surface of the touch plate 640, as previously illustrated in FIG. 3. In FIG. 5, an exemplary sensor assembly 200 is shown in broken lines as being attached to the interior surface of the touch plate 640.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of providing a wake up feature to an in-counter bar code scanner allowing a user to wake up the bar code scanner from its power-saving standby mode comprising:
    attaching an oscillating magnet member to a portion of the bar code scanner, the oscillating magnet member comprising a base and a permanent magnet attached to the base by a flexible member extending between the base and the permanent magnet, wherein base of the oscillating magnet member gets attached to said portion of the bar code scanner; and
    attaching a pick-up coil to said portion of the bar code scanner at a magnetically effective distance from the permanent magnet, wherein when a user touches said portion of the bar code scanner an impact force exerted on the bar code scanner is transmitted to the oscillating magnet member causing the permanent magnet to oscillate inducing an electrical signal in the pick-up coil for waking up the bar code scanner from its standby mode,
    wherein said portion of the bar code scanner is a scanning surface having an exterior surface exposed to the user and an interior surface, and the base of the oscillating magnet member is attached to the interior surface of the scanning surface.

2. The method of claim 1, further comprising the step of providing a detection amplifier circuit in the bar code scanner for amplifying and the electrical signal induced in the pick-up coil.

3. A method of providing a wake up feature to an in-counter bar code scanner allowing a user to wake up the bar code scanner from its power-saving standby mode comprising:
    attaching a sensor assembly to a portion of the bar code scanner, wherein the sensor assembly comprises:
        a frame member;
        an oscillating magnet member having a base and a permanent magnet attached to the base by a flexible member extending between the base and the permanent magnet, wherein the base of the oscillating magnet member is attached to the frame member; and
        a pick-up coil attached to the frame member at a magnetically effective distance from the permanent magnet, wherein when a user touches said portion of the bar code scanner an impact force exerted on the bar code scanner is transmitted to the oscillating magnet member causing the permanent magnet to oscillate inducing an electrical signal in the pick-up coil for waking up the bar code scanner from its standby mode,
    wherein said portion of the bar code scanner is a scanning surface having an exterior surface exposed to the user and an interior surface, and the frame member of the sensor assembly is attached to the interior surface of the scanning surface.

4. The method of claim 3, further comprising the step of providing a detection amplifier circuit in the bar code scanner for amplifying and the electrical signal induced in the pick-up coil.

5. An in-counter bar code scanner comprising:
    a sensor system for waking up the bar code scanner from its power-saving standby mode, the sensor system comprising:
        an oscillating magnet member comprising a base and a permanent magnet attached to the base by a flexible member extending between the base and the permanent magnet, the base of the oscillating magnet member attached to a portion of the bar code scanner; and
        a pick-up coil provided at a magnetically effective distance from the permanent magnet and attached to the bar code scanner, wherein when a user touches the bar code scanner and exerts an impact force on the bar code scanner, the impact force is transmitted to the oscillating magnet member causing the permanent magnet to oscillate inducing an electrical signal in the pick-up coil for waking up the bar code scanner from its standby mode,
    wherein said portion of the bar code scanner is a scanning surface having an exterior surface exposed to the user and an interior surface, and the base of the oscillating magnet member is attached to the interior surface of the scanning surface.

6. The bar code scanner of claim 5, further comprising a signal amplifying circuit operably connected to the pick-up coil for amplifying the electrical signal.

* * * * *